United States Patent
Yang et al.

(12) 
(10) Patent No.: US 10,007,121 B2
(45) Date of Patent: Jun. 26, 2018

(54) SEE-THROUGH HEAD-MOUNTED DISPLAY

(71) Applicant: Quanta Computer Inc., Taoyuan (TW)

(72) Inventors: Wen-Chu Yang, Taoyuan (TW); Cheng-Ta Miao, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 213 days.

(21) Appl. No.: 14/828,885

(22) Filed: Aug. 18, 2015

(65) Prior Publication Data
US 2017/0052379 A1 Feb. 23, 2017

(51) Int. Cl.
*G02B 27/01* (2006.01)
*G02B 27/28* (2006.01)
*G02B 5/30* (2006.01)

(52) U.S. Cl.
CPC ....... *G02B 27/0179* (2013.01); *G02B 5/3083* (2013.01); *G02B 27/0172* (2013.01); *G02B 27/0176* (2013.01); *G02B 27/283* (2013.01); *G02B 2027/0159* (2013.01); *G02B 2027/0185* (2013.01)

(58) Field of Classification Search
CPC ............... G02B 27/01; G02B 27/0101; G02B 27/0149; G02B 27/017; G02B 27/0172; G02B 27/0176; G02B 27/0179; H04N 13/044; H04N 5/7491

USPC ...... 359/13–14, 629–633; 345/7–9; 348/115; 349/11
See application file for complete search history.

(56) References Cited

U.S. PATENT DOCUMENTS

| | | | |
|---|---|---|---|
| 8,643,948 B2* | 2/2014 | Amitai | G02B 27/0101 359/489.07 |
| 2011/0241975 A1* | 10/2011 | Mukawa | G02B 5/32 345/8 |
| 2015/0077312 A1* | 3/2015 | Wang | G02B 27/017 345/7 |

* cited by examiner

*Primary Examiner* — Robert E Tallman
(74) *Attorney, Agent, or Firm* — McClure, Qualey & Rodack, LLP

(57) ABSTRACT

The invention provides a see-through head-mounted display, including: an inner optical mechanism covered by a non-transparent housing having an opening and providing an image beam from the opening; and an outer optical mechanism including an outer polarizing beam splitter guiding the image beam from the opening and an environment beam to the same direction. The inner optical mechanism includes at least a mirror and a driving motor. The mirror reflects the image beam to make the image beam incident to the outer optical mechanism. The driving motor moves the mirror to vary the image distance from the mirror.

10 Claims, 12 Drawing Sheets

SEE-THROUGH HEAD-MOUNTED DISPLAY

BACKGROUND OF THE INVENTION

Field of the Invention

The present invention relates to a see-through head-mounted display, and in particular to a see-through head-mounted display capable of adjusting the virtual image distance with a stable and reliable structure.

Description of the Related Art

In an optical see-through head-mounted display, such as Google Glass, the real image is overlaid with a virtual image. Theoretically, the virtual image distance is required to be substantially the same as the real image distance. If the object being looked at and the virtual image are not located on the same image plane (namely, the distances from the virtual image and from the real image are different to the user's eye), the user's eye has to continuously adjust the focal lengths of their crystalline lens to adapt to the virtual image distance and the real image distance to clearly see both the virtual image and the real image. However, the virtual image distance is fixed according to the optical mechanism of the existing see-through head-mounted display. Using Google Glass as an example: The virtual image distance is fixed to about 3 m, and this design is inconvenient for users because frequent adjustments to the crystalline lens are required in order to allow the user to see the virtual image and the real image, and this can cause the eyes to become tired.

FIG. 1 is a diagram showing the application of a see-through head-mounted display. The left part of FIG. 1 shows that a user wearing a see-through head-mounted display is driving and watching the car in front. Meanwhile, the see-through head-mounted display displays a Google Map. If the see-through head-mounted display doesn't display the virtual image at the distance (such as Z1 shown in FIG. 1) at which the car in front is located, the user has to adjust the crystalline lens of his eye to monitor both the car in front (the real image) and the Google Map (virtual image). The right part of FIG. 1 shows that the user wearing the see-through head-mounted display is reading and focusing his eye on the book at a distance of about 30 cm (such as Z2 shown in FIG. 1). At this moment, a message "You've got Mail" pops up on the see-through head-mounted display. If the distance of the virtual image of this message is still fixed to 3 m, it is apparently very inconvenient for the user to read the message.

FIG. 2 is a diagram showing a structure of a conventional see-through head-mounted display. The structure of the conventional see-through head-mounted display 10 is divided into two portions: an inner optical mechanism 10a and an outer optical mechanism 10b. In FIG. 2, the portion shown in the right side of the dotted line is the inner optical mechanism 10a and the portion shown in the left side of the dotted line is the outer optical mechanism 10b. The optical components of the inner optical mechanism 10a are encapsulated in a nontransparent housing (not shown), and the housing has an opening (not shown) for outputting the image beam. In contrast to the inner optical mechanism 10a, the optical components of the outer optical mechanism 10b are transparent which allow the real image beam (or the environment beam) incident to the user's eye.

The inner optical mechanism 10a includes a LED backlight 101, a polarizer 102, a collimating lens 103, a polarizing beam splitter 104, and a LCOS (liquid crystal on silicon) panel 105. The LED backlight 101, the polarizer 102, the collimating lens 103, and the LCOS panel are arranged at the same side of the polarizing beam splitter 104. First, the LED backlight 101 emits unpolarized light including P-polarized beams of which the polarization is parallel to the incident plane and S-polarized beams of which the polarization is perpendicular to the incident plane. The polarizer 102 passes the light of a specific polarization (S-polarized beam shown in FIG. 2 is an example) and blocks the light of other polarizations. The collimating lens 103 converts the light that travels through the polarizer 102 into parallel light. Those parallel S-polarized beams are incident to the polarizing beam splitter 104. The polarizing beam splitter 104 is a P-type polarizing beam splitter which transmits the P-polarized beam and reflects the S-polarized beam. Therefore, the polarizing beam splitter 104 reflects the incident S-polarized beam to the LCOS panel 105. The LCOS panel 105 has a liquid-crystal layer which can rotate the polarization of the incident light and a reflecting layer which reflects the incident light back to the incident direction. The LCOS panel 105 is driven by voltage to control the polarization of light of each pixel. In this way, the LCOS panel 105 sends image light (including the S-polarized beam and the P-polarized beam) back to the polarizing beam splitter 104. The polarizing beam splitter 104 transmits only the P-polarized beam to the outer optical mechanism 10b from the opening of the inner optical mechanism 10a.

The outer optical mechanism 10b includes a polarizing beam splitter 106, a quarter wave plate 107, and a concave mirror 108. The quarter wave plate 107, the concave mirror 108, and the user's eye are located at one side of the polarizing beam splitter 106. The real image beam and the virtual image beam are incident to the polarizing beam splitter 106 at the other side of the polarizing beam splitter 106. The polarizing beam splitter 106 is also a P-type polarizing beam splitter, so the P-polarized beam that came from the inner optical mechanism 10a passes through the polarizing beam splitter 106 and is incident to the quarter wave plate 107. The quarter wave plate 107 converts the P-polarized beam into a circularly polarized beam (such as a clockwise circularly polarized beam). The circularly polarized beam is reflected by the concave mirror 108 and is incident to the quarter wave plate 107 again. The quarter wave plate 107 converts the circularly polarized beam into the S-polarized beam. The S-polarized beam is reflected by the polarizing beam splitter 106 to the user's eye. On the other hand, the real image light from the object including the P-polarized beam and the S-polarized beam is also incident to the polarizing beam splitter 106, and only the P-polarized beam of the real image light passes through the polarizing beam splitter 106 and is incident to the user's eye. According to the above structure, the user can see both the real image and the virtual image.

However, the distance d between the LCOS panel 105 and the concave mirror 108 is fixed, so the virtual image distance is also fixed. This causes the aforementioned problem wherein the user has to adjust the crystalline lens frequently to see both the virtual image and the real image. Even though the concave mirror 108 is designed to be driven by a driving mechanism to move to vary the distance from the LCOS panel 105, because the concave mirror 108 and the driving mechanism are exposed outside, the reliability, stability, and durability (such as it being water-proof or dust-proof) of the product are substantially reduced.

BRIEF SUMMARY OF THE INVENTION

A detailed description is given in the following embodiments with reference to the accompanying drawings.

The invention provides a see-through head-mounted display, including: an inner optical mechanism covered by a nontransparent housing having an opening and providing an image beam from the opening; and an outer optical mechanism comprising an outer polarizing beam splitter guiding the image beam from the opening and an environment beam to the same direction. The inner optical mechanism comprises: an inner polarizing beam splitter, reflecting either a first polarized beam which is polarized in a first direction or a second polarized beam which is polarized in a second direction perpendicular to the first direction, and transmitting the other; a backlight module providing the first polarized beam to the inner polarizing beam splitter; a micro display panel converting the first polarized beam from the inner polarizing beam splitter to the second polarized beam as the image beam and directing the image beam back to the inner polarizing beam splitter; an inner ¼ wave plate through which the image beam from the inner polarizing beam splitter travels; a mirror reflecting the image beam traveling through the inner ¼ wave plate to make the image beam incident to the inner ¼ wave plate and the inner polarizing beam splitter in sequence and emitted from the opening; and a driving motor moving the mirror to vary the distance between the mirror and the inner ¼ wave plate.

In the above see-through head-mounted display according to an embodiment of the invention, the mirror is a concave mirror.

In the above see-through head-mounted display according to an embodiment of the invention, it is assumed that the distance between the micro display panel and a splitting interface of the inner polarizing beam splitter is d1; the distance between the concave mirror and the splitting interface of the inner polarizing beam splitter is d2; and the focal length of concave mirror is F, and the following equation is satisfied:

$$d1+d2 \leq F.$$

In the above see-through head-mounted display according to an embodiment of the invention, the backlight module and the opening are arranged at a first side of a splitting interface of the inner polarizing beam splitter, and the micro display panel, the inner ¼ wave plate, and the concave mirror are arranged at a second side of the splitting interface of the inner polarizing beam splitter, which is opposite to the first side. The inner polarizing beam splitter transmits the first polarized beam and reflects the second polarized beam, and the outer polarizing beam splitter transmits the second polarized beam and reflects the first polarized beam.

In the above see-through head-mounted display according to an embodiment of the invention, the backlight module and the micro display panel are arranged at a first side of a splitting interface of the inner polarizing beam splitter, and the inner ¼ wave plate, the concave mirror, and the opening are arranged at a second side of the splitting interface of the inner polarizing beam splitter, which is opposite to the first side, and wherein both the inner and outer polarizing beam splitter s transmit the second polarized beam and reflect the first polarized beam.

In the above see-through head-mounted display according to an embodiment of the invention, the outer optical mechanism further includes: a polarizer that passes the first polarized beam of the environment beam, and a liquid-crystal panel arranged between the polarizer and the outer polarizing beam splitter and controlled by voltage to modulate the first polarized beam incident from the polarizer and provide the modulated beam to the outer polarizing beam splitter. The backlight module and the opening are arranged at a first side of a splitting interface of the inner polarizing beam splitter, and the micro display panel, the inner ¼ wave plate, and the concave mirror are arranged at a second side of the splitting interface of the inner polarizing beam splitter, which is opposite to the first side. The inner polarizing beam splitter transmits the first polarized beam and reflects the second polarized beam, and the outer polarizing beam splitter transmits the second polarized beam and reflects the first polarized beam.

In the above see-through head-mounted display according to an embodiment of the invention, the outer optical mechanism further includes a polarizer that passes the first polarized beam of the environment beam, and a liquid-crystal panel arranged between the polarizer and the outer polarizing beam splitter and controlled by voltage to modulate the first polarized beam incident from the polarizer and provide the modulated beam to the outer polarizing beam splitter. The backlight module and the micro display panel are arranged at a first side of a splitting interface of the inner polarizing beam splitter, and the inner ¼ wave plate, the concave mirror, and the opening are arranged at a second side of the splitting interface of the inner polarizing beam splitter, which is opposite to the first side. Both the inner and outer polarizing beam splitters transmit the second polarized beam and reflect the first polarized beam.

In the above see-through head-mounted display according to an embodiment of the invention, the mirror is a plane mirror, and the outer optical mechanism further includes: an outer ¼ wave plate through which the image beam from the opening travels, and a concave mirror reflecting the image traveling through the outer ¼ wave plate to make the image beam incident to the outer ¼ wave plate and the outer polarizing beam splitter in sequence and emitted in the direction where the environment beam travels.

In the above see-through head-mounted display according to an embodiment of the invention, it is assumed that the distance between the micro display panel and a splitting interface of the inner polarizing beam splitter is d1; the distance between the plane mirror and the splitting interface of the inner polarizing beam splitter is d2; the distance between the splitting interface of the inner polarizing beam splitter and the concave mirror is d3; and the focal length of concave mirror is F, and the following equation is satisfied:

$$d1+2 \times d2+d3 \leq F.$$

In the above see-through head-mounted display according to an embodiment of the invention, both the inner and outer polarizing beam splitters transmit the first polarized beam and reflect the second polarized beam.

In the above see-through head-mounted display according to an embodiment of the invention, the mirror is a plane mirror, the inner polarizing beam splitter is formed from a first lens with a beam splitting function, and the outer polarizing beam splitter is formed from a second lens with a beam splitting function, wherein the first lens has a concave surface as a light emitting surface and the second lens has a convex surface as a light incident surface, wherein the concave surface and the convex surface are adhered together such that the first lens and the second lens forms a compound lens.

In the above see-through head-mounted display according to an embodiment of the invention, it is assumed that the refractive index of the first lens is n1 and the refractive index of the second lens is n2, and the following equation is satisfied:

$$n1<n2, \text{ and}$$

it is assumed that the distance between the micro display panel and a splitting interface of the inner polarizing beam splitter is d1; the distance between the plane mirror and the splitting interface of the inner polarizing beam splitter is d2; the distance between the splitting interface of the inner polarizing beam splitter and the adhered interface of the compound lens is d3; and the first focal length of convex surface of the second lens is F, and the following equation is satisfied:

$$d1+2\times d2+d3 \leq F$$

In the above see-through head-mounted display according to an embodiment of the invention, the inner polarizing beam splitter transmits the first polarized beam and reflects the second polarized beam, and the outer polarizing beam splitter transmits the second polarized beam and reflects the first polarized beam.

The invention also provides a see-through head-mounted display, including: an inner optical mechanism covered by a nontransparent housing having an opening and providing an image beam from the opening; and an outer optical mechanism comprising an outer polarizing beam splitter guiding the image beam from the opening and an environment beam to the same direction. The inner optical mechanism includes: a first inner polarizing beam splitter and a second inner polarizing beam splitter, each of which reflects either a first polarized beam which is polarized in a first direction or a second polarized beam which is polarized in a second direction perpendicular to the first direction and transmits the other; a backlight module providing the first polarized beam to the first inner polarizing beam splitter; a micro display panel converting the first polarized beam from the first inner polarizing beam splitter to the second polarized beam as the image beam and directing the image beam back to the first inner polarizing beam splitter; a first inner ¼ wave plate through which the image beam from the first inner polarizing beam splitter travels; a plane mirror reflecting the image beam traveling through the first inner ¼ wave plate to make the image beam incident to the first inner ¼ wave plate, the first inner polarizing beam splitter, and the second inner polarizing beam splitter in sequence; a second ¼ wave plate through which the image beam from the second inner polarizing beam splitter travels; a concave mirror reflecting the image beam traveling through the second inner ¼ wave plate to make the image beam incident to the second inner ¼ wave plate and the second inner polarizing beam splitter in sequence and emitted from the opening; and a driving motor moving either the plane mirror to vary the distance between the plane mirror and the first inner ¼ wave plate or the concave mirror to vary the distance between the concave mirror and the second inner ¼ wave plate. The outer optical mechanism further includes: a polarizer that passes the second polarized beam of the environment beam, and a liquid-crystal panel arranged between the polarizer and the outer polarizing beam splitter and controlled by voltage to modulate the second polarized beam incident from the polarizer and provide the modulated beam to the outer polarizing beam splitter.

In the above see-through head-mounted display according to an embodiment of the invention, it is assumed that the distance between the micro display panel and a splitting interface of the first inner polarizing beam splitter is d1; the distance between the plane mirror and the splitting interface of the first inner polarizing beam splitter is d2; the distance between the splitting interface of the first inner polarizing beam splitter and the concave mirror is d3; and the focal length of concave mirror is F, and the following equation is satisfied:

$$d1+2\times d2+d3 \leq F.$$

In the above see-through head-mounted display according to an embodiment of the invention, the first inner polarizing beam splitter, the second inner polarizing beam splitter, and the outer polarizing beam splitter transmit the first polarized beam and reflect the second polarized beam.

The invention also provides a see-through head-mounted display, including: an inner optical mechanism covered by a nontransparent housing having an opening and providing an image beam from the opening; and an outer optical mechanism comprising an outer polarizing beam splitter guiding the image beam from the opening and an environment beam to the same direction. The inner optical mechanism includes: a first inner polarizing beam splitter, reflecting either a first polarized beam which is polarized in a first direction or a second polarized beam which is polarized in a second direction perpendicular to the first direction, and transmitting the other; a backlight module providing the first polarized beam to the first inner polarizing beam splitter; a micro display panel converting the first polarized beam from the first inner polarizing beam splitter to the second polarized beam as the image beam and directing the image beam back to the first inner polarizing beam splitter; a ¼ wave plate through which the image beam from the first inner polarizing beam splitter travels; a plane mirror reflecting the image beam traveling through the ¼ wave plate to make the image beam incident to the ¼ wave plate, the first inner polarizing beam splitter in sequence, and emitted from the opening; and a driving motor moving the plane mirror to vary the distance between the plane mirror and the ¼ wave plate. The outer optical mechanism further includes: a polarizer that passes the first polarized beam of the environment beam, and a liquid-crystal panel arranged between the polarizer and the outer polarizing beam splitter and controlled by voltage to modulate the first polarized beam incident from the polarizer and provide the modulated beam to the outer polarizing beam splitter. The first inner polarizing beam splitter is a compound lens comprising a first lens with a beam splitting function, wherein the first lens has a concave surface as a light emitting surface thereof and the second lens has a convex surface as a light incident surface thereof and a plane surface as a light emitting surface thereof. The concave surface and the convex surface are adhered together.

In the above see-through head-mounted display according to an embodiment of the invention, it is assumed that the refractive index of the first lens is n1 and the refractive index of the second lens is n2, and the following equation is satisfied:

$$n1<n2, \text{ and}$$

it is assumed that the distance between the micro display panel and a splitting interface of the first inner polarizing beam splitter is d1; the distance between the plane mirror and the splitting interface of the first inner polarizing beam splitter is d2; the distance between the splitting interface of the first inner polarizing beam splitter and the adhered interface of the compound lens is d3; and the first focal length of convex surface of the second lens is F, and the following equation is satisfied:

$$d1+2\times d2+d3 \leq F.$$

In the above see-through head-mounted display according to an embodiment of the invention, the first inner polarizing beam splitter transmits the first polarized beam and reflects the second polarized beam, and the outer polarizing beam splitter transmits the second polarized beam and reflects the first polarized beam.

In the above see-through head-mounted display according to an embodiment of the invention, the second lens forms a second inner polarizing bean splitter. The first inner polarizing beam splitter transmits the first polarized beam and reflects the second polarized beam, and the second inner polarizing beam splitter and the outer polarizing beam splitter transmits the second polarized beam and reflects the first polarized beam.

In the above see-through head-mounted display according to an embodiment of the invention, the second lens forms a second inner polarizing bean splitter. The first inner polarized beam splitter transmits the first polarized beam and reflects the second polarized beam, and the second inner polarized beam splitter and the outer polarized beam splitter transmits the second polarized beam and reflects the first polarized beam.

According to the above embodiments, a driving motor is arranged to move the concave mirror or plane mirror to change the virtual image distance. Because the movable elements are arranged in the inner optical mechanism, the reliability, stability, and durability issues for the see-through head-mounted display are substantially solved.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
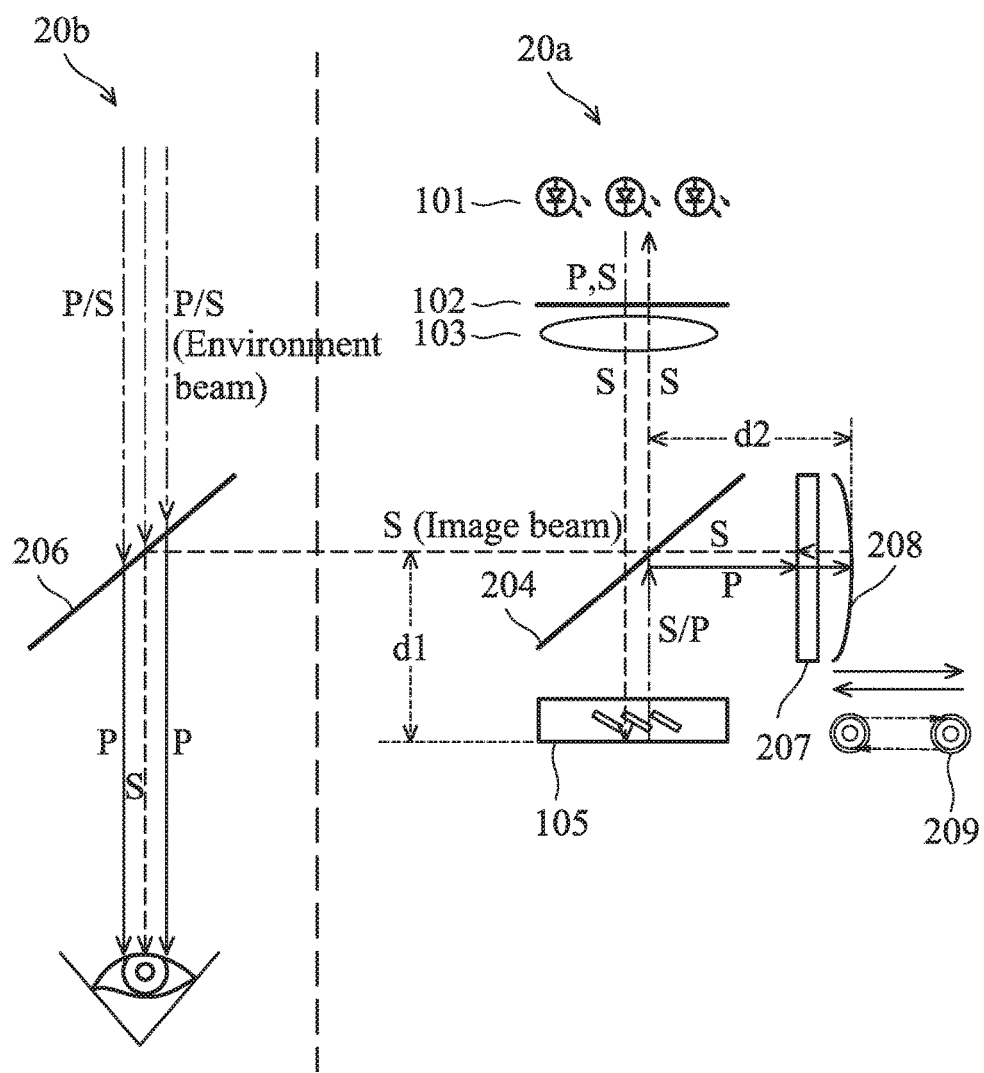
FIG. 3 is a diagram showing a structure of a see-through head-mounted display in accordance with Embodiment 1 of the invention.

The embodiments of the invention are described with reference to the drawings. The same elements in different figures are labeled with the same numeral, and detailed descriptions of those elements are omitted. FIG. 3 is a diagram showing a structure of a see-through head-mounted display in accordance with Embodiment 1 of the invention.

As shown in FIG. 3, the structure of the see-through head-mounted display 20 of Embodiment 1 comprises: an inner optical mechanism 20a and an outer optical mechanism 20b. The optical components of the inner optical mechanism 20a are encapsulated in a nontransparent housing (not shown), and the housing has an opening (not shown) for outputting the image beam. In contrast to the inner optical mechanism 20a, the optical components of the outer optical mechanism 20b are transparent which allow the real image beam (or the environment beam) incident to the user's eye.

The inner optical mechanism 20a includes a LED backlight 101, a polarizer 102, a collimating lens 103, a polarizing beam splitter 204, a LCOS panel 105, a quarter wave plate 207, and a concave mirror 208. The LED backlight 101, the polarizer 102, the collimating lens 103, and the opening (not shown) of the housing are arranged at one side of the polarizing beam splitter 204. The LCOS panel 105, the quarter wave plate 207, and the concave mirror 208 are arranged at the other side of the polarizing beam splitter 204. The LED backlight 101, the polarizer 102, and the collimating lens 103 form a backlight module which emits parallel S-polarized beams. Each element of the backlight module is the same as those in FIG. 2, so the details of the backlight module will not be described again. Those parallel S-polarized beams emitted by the backlight module are incident to the polarizing beam splitter 204. The polarizing beam splitter 204 is an S-type polarizing beam splitter which transmits the S-polarized beam and reflects the P-polarized beam. Therefore, the polarizing beam splitter 204 transmits the incident S-polarized beam to the LCOS panel 105. The LCOS panel 105 sends image light including the S-polarized beam and the P-polarized beam back to the polarizing beam splitter 204. The P-polarized beam is reflected by the polarizing beam splitter 204 to the quarter wave plate 207. The S-polarized beam passes through polarizing beam splitter 204 and becomes a useless light beam. The quarter wave plate 207 converts the P-polarized beam into a circularly polarized beam (such as a clockwise circularly polarized beam). The concave mirror 208 generates a magnified virtual image. The circularly polarized beam is reflected by the concave mirror 208 and is incident to the quarter wave plate 207 again. The quarter wave plate 207 converts the circularly polarized beam into the S-polarized beam. The S-polarized beam passes through the polarizing beam splitter 204 and is emitted from the opening of the inner optical mechanism 20a to the outer optical mechanism 20b.

The outer optical mechanism 20b has only one element: a polarizing beam splitter 206. The opening of the inner optical mechanism 20a and the user's eye are located at the same side of the polarizing beam splitter 206. The real object is located at the other side of the polarizing beam splitter 206. The polarizing beam splitter 206 is a P-type polarizing beam splitter which transmits the P-polarized beam and reflects the S-polarized beam. Therefore, the S-polarized beam that came from the inner optical mechanism 20a is reflected by the polarizing beam splitter 206 and is incident to the user's eye. On the other hand, the real image light from the object including the P-polarized beam and the S-polarized beam is also incident to the polarizing beam splitter 206, and only the P-polarized beam of the real image light passes through the polarizing beam splitter 206 and is incident to the user's eye. In this way, the see-through head-mounted display 20 also allows the user to see both the real image and the virtual image.

However, the inner optical mechanism 20a further includes a driving motor 209. The driving motor 209 can move the concave mirror 208 with respect to the quarter wave plate 207, so as to vary the distance between the concave mirror 208 and the quarter wave plate 207. According to the principle of imaging for a concave mirror, when an object is placed at a distance within the focal length of a concave mirror, a magnified virtual image of the object is formed. The closer the object gets to the focal point of the concave mirror, the bigger the magnified virtual image becomes, and the longer the virtual image distance from the concave mirror becomes. Therefore, changing the position of the concave mirror 208 with respect to the quarter wave plate 207 by the driving motor 209 can adjust the virtual image distance. In this way, the see-through head-mounted display 20 can adjust the virtual image distance to match the real image distance to make the user see both the virtual image and the real image easily. Note that the object has to be placed at a distance within the focal length of a concave mirror to form a virtual image. Thus, the optical distance from the LCOS panel 105 to the concave mirror 208 should be shorter than or equal to the focal length of the concave mirror 208. If the distance between the LCOS panel 105 and a splitting interface of the polarizing beam splitter 204 is d1, the distance between the concave mirror 208 and the splitting interface of the polarizing beam splitter 204 is d2, and the focal length of concave mirror 208 is F, and the following equation has to be satisfied:

$$d1+d2 \leq F.$$

According to the structure of the see-through head-mounted display 20 of Embodiment 1, a driving motor is arranged to move the concave mirror to change the virtual image distance. Because the movable elements are arranged in the inner optical mechanism, the reliability, stability, and durability issues for the see-through head-mounted display 20 are substantially solved.

Figure 4:
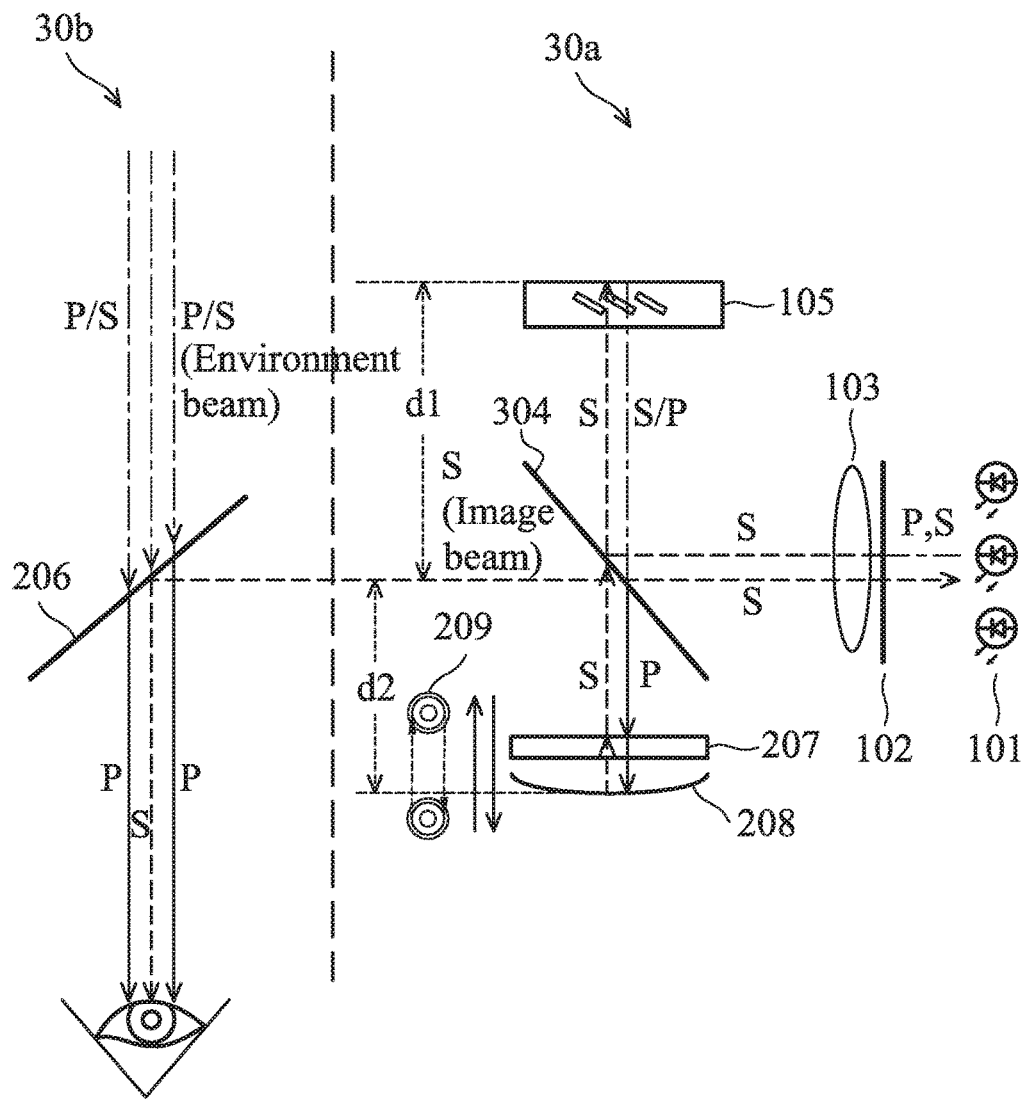
FIG. 4 is a diagram showing a structure of a see-through head-mounted display in accordance with Embodiment 2 of the invention.

FIG. 4 is a diagram showing a structure of a see-through head-mounted display in accordance with Embodiment 2 of the invention. The difference between Embodiment 1 and Embodiment 2 is that the S-type polarizing beam splitter 204 is replaced by a P-type polarizing beam splitter 304 and the positions of the other elements are changed. As shown in FIG. 4, the structure of the see-through head-mounted display 30 of Embodiment 2 comprises: an inner optical mechanism 30a and an outer optical mechanism 30b. The LED backlight 101, the polarizer 102, the collimating lens 103, and the LCOS panel 105 are arranged at one side of the polarizing beam splitter 304. The opening of the inner optical mechanism 30a, the quarter wave plate 207, and the concave mirror 208 are arranged at the other side of the polarizing beam splitter 204.

In the inner optical mechanism 30a, the backlight module emits parallel S-polarized beams. Those parallel S-polarized beams emitted by the backlight module are incident to the polarizing beam splitter 304. The polarizing beam splitter 304 reflects the incident S-polarized beam to the LCOS panel 105. The LCOS panel 105 sends image light including the S-polarized beam and the P-polarized beam back to the polarizing beam splitter 304. The P-polarized beam passes through the polarizing beam splitter 304 to the quarter wave plate 207. The S-polarized beam is reflected by the polarizing beam splitter 304 and becomes a useless light beam. The quarter wave plate 207 converts the P-polarized beam into a circularly polarized beam (such as a clockwise circularly polarized beam). The concave mirror 208 generates a magnified virtual image. The circularly polarized beam is reflected by the concave mirror 208 and is incident to the quarter wave plate 207 again. The quarter wave plate 207 converts the circularly polarized beam into the S-polarized beam. The S-polarized beam is reflected by the polarizing beam splitter 304 and is emitted from the opening of the inner optical mechanism 30a to the outer optical mechanism 30b.

In the outer optical mechanism 30b, the S-polarized beam that came from the inner optical mechanism 30a is reflected by the polarizing beam splitter 206 and is incident to the user's eye. On the other hand, the real image light from the object including the P-polarized beam and the S-polarized beam is also incident to the polarizing beam splitter 206, and only the P-polarized beam of the real image light passes through the polarizing beam splitter 206 and is incident to the user's eye. In this way, the see-through head-mounted display 20 also allows the user to see both the real image and the virtual image.

The see-through head-mounted display 30 also has a driving motor 209 in the inner optical mechanism 30a to move the concave mirror 208 with respect to the quarter wave plate 207. Therefore, the see-through head-mounted display 30 of Embodiment 2 has all the advantages of the see-through head-mounted display 20 of Embodiment 1. Also, the optical distance from the LCOS panel 105 to the concave mirror 208 should be shorter than or equal to the focal length of the concave mirror 208. Therefore, if the distance between the LCOS panel 105 and a splitting interface of the polarizing beam splitter 304 is d1, the distance between the concave mirror 208 and the splitting interface of the polarizing beam splitter 304 is d2, and the focal length of concave mirror 208 is F, and the following equation has to be satisfied:

$$d1+d2 \leq F.$$

Figure 5A:
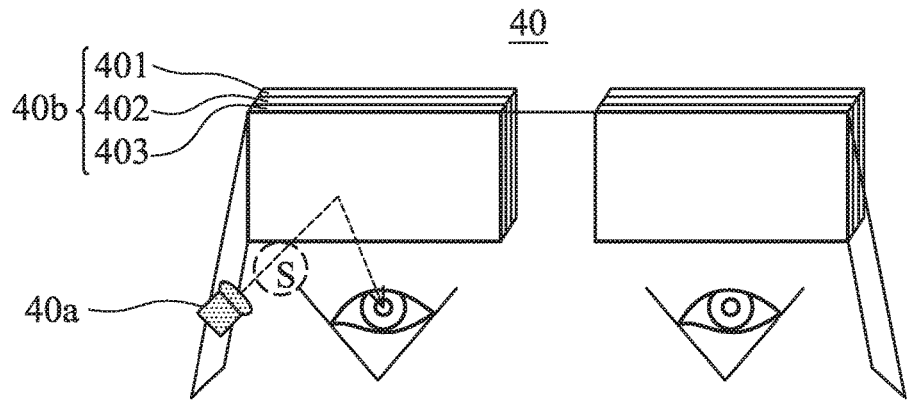
FIG. 5A is a diagram showing a see-through head-mounted display in accordance with Embodiment 3 of the invention.
Figure 5B:
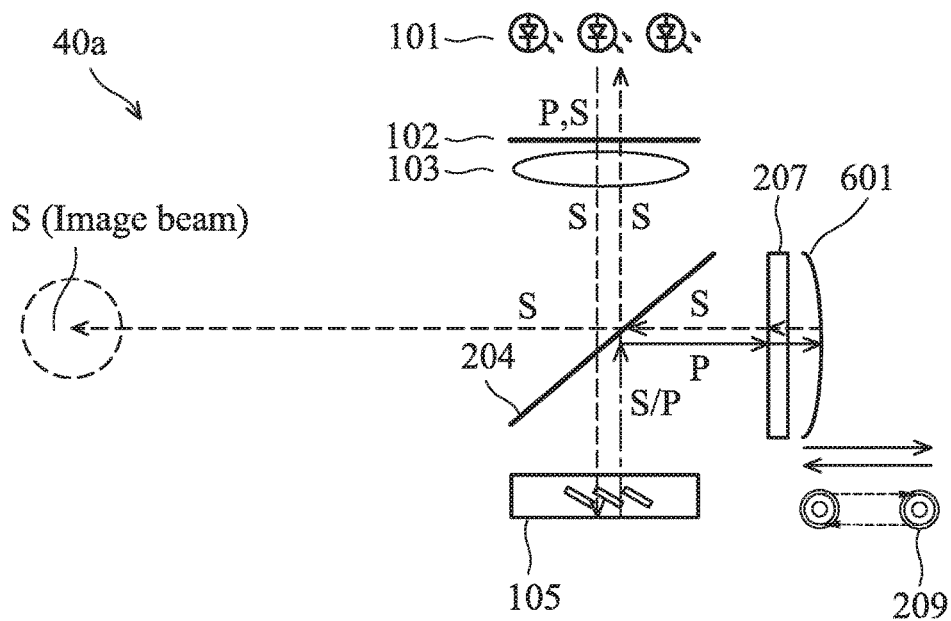
FIG. 5B is a diagram showing the inner optical mechanism of a see-through head-mounted display in accordance with Embodiment 3 of the invention.

FIG. 5A is a diagram showing a see-through head-mounted display in accordance with Embodiment 3 of the invention. FIG. 5B is a diagram showing the inner optical mechanism of a see-through head-mounted display in accordance with Embodiment 3 of the invention. The difference between Embodiment 1 and Embodiment 3 is that the outer optical mechanism of the see-through head-mounted display is changed.

As shown in FIG. 5A, the structure of the see-through head-mounted display 40 of Embodiment 3 comprises: an inner optical mechanism 40a and an outer optical mechanism 40b. The outer optical mechanism 40b is a multilayer structure including: a polarizer 401, a liquid-crystal panel 402, and a polarizing beam splitter 403, which are arranged in sequence along the incident direction of the real image light (environment light). The polarizer 401 passes the S-polarized beam of the real image light and blocks the P-polarized beam of the real image light. The liquid-crystal panel 402 is controlled by voltage to modulate the S-polarized beam incident from the polarizer 401 and transmit the modulated light beam to the polarizing beam splitter 403. The polarizing beam splitter 403 is a P-type polarizing beam splitter which transmits the P-polarized beam of the real image light to the user's eye. By the structure of the outer optical mechanism 40b, the transmittance ratio of the real image light can be controlled. Therefore, the user can adjust the intensity of the real light according to need.

The structure of the inner optical mechanism 40a is shown in FIG. 5B, which is completely the same as the structure of the inner optical mechanism 20a shown in FIG. 3. Therefore, detailed descriptions of the inner optical mechanism 40a are omitted. Back to FIG. 5A, the S-polarized beam emitted from the inner optical mechanism 40a is reflected by the polarizing beam splitter 403 and is incident to the user's eye.

Figure 6A:
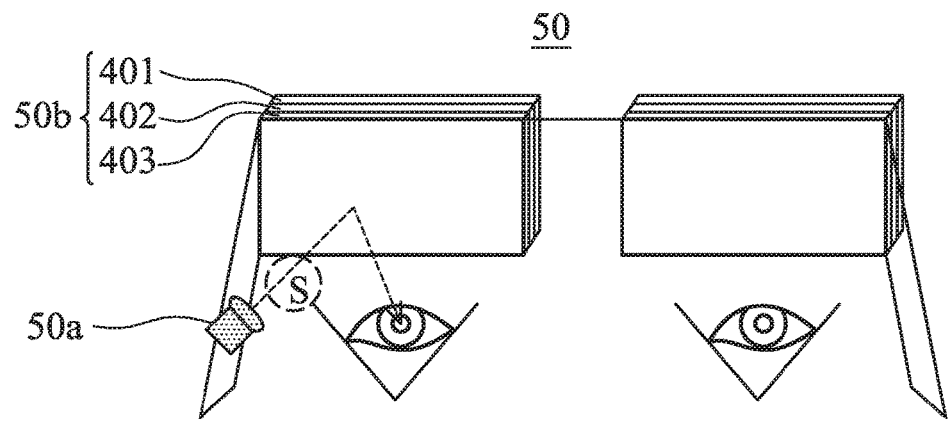
FIG. 6A is a diagram showing a see-through head-mounted display in accordance with Embodiment 4 of the invention.
Figure 6B:
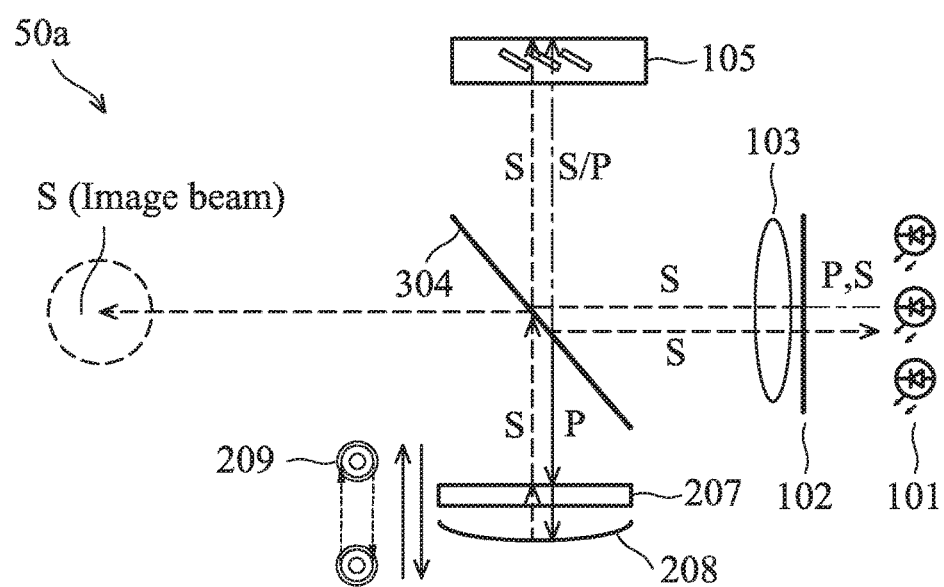
FIG. 6B is a diagram showing the inner optical mechanism of a see-through head-mounted display in accordance with Embodiment 4 of the invention.

FIG. 6A is a diagram showing a see-through head-mounted display in accordance with Embodiment 4 of the invention. FIG. 6B is a diagram showing the inner optical mechanism of a see-through head-mounted display in accordance with Embodiment 4 of the invention. As shown in FIG. 6A, the structure of the see-through head-mounted display 50 of Embodiment 4 comprises: an inner optical mechanism 50a and an outer optical mechanism 50b. The structure of the inner optical mechanism 50a shown in FIG. 6B is completely the same as the structure of the inner optical mechanism 30a shown in FIG. 4. The structure of the outer optical mechanism 50b shown in FIG. 6A is completely the same as the structure of the outer optical mechanism 40b shown in FIG. 5A. Therefore, detailed descriptions of the see-through head-mounted display 50 are omitted.

Figure 1:
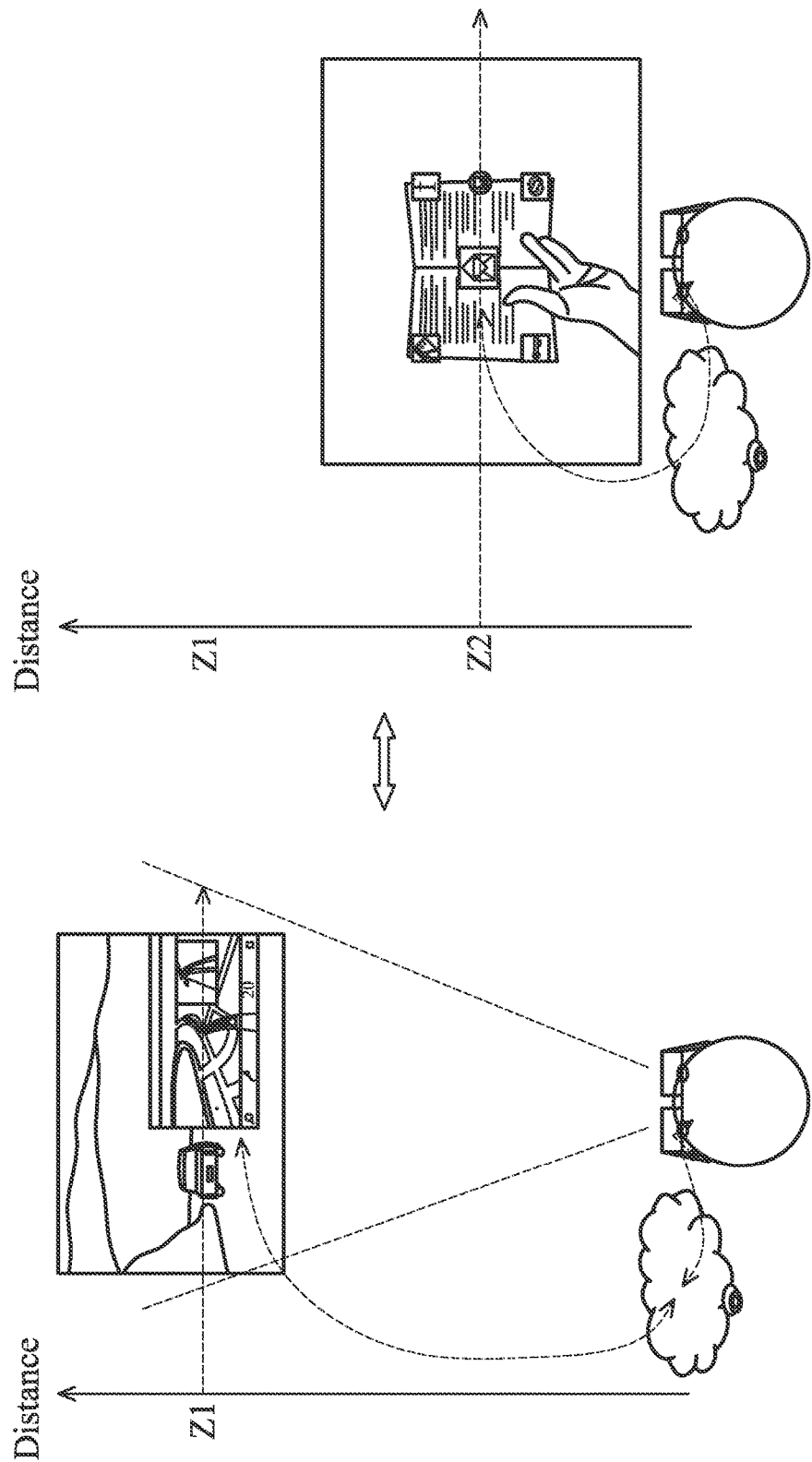
FIG. 1 is a diagram showing the application of a see-through head-mounted display.
Figure 7:
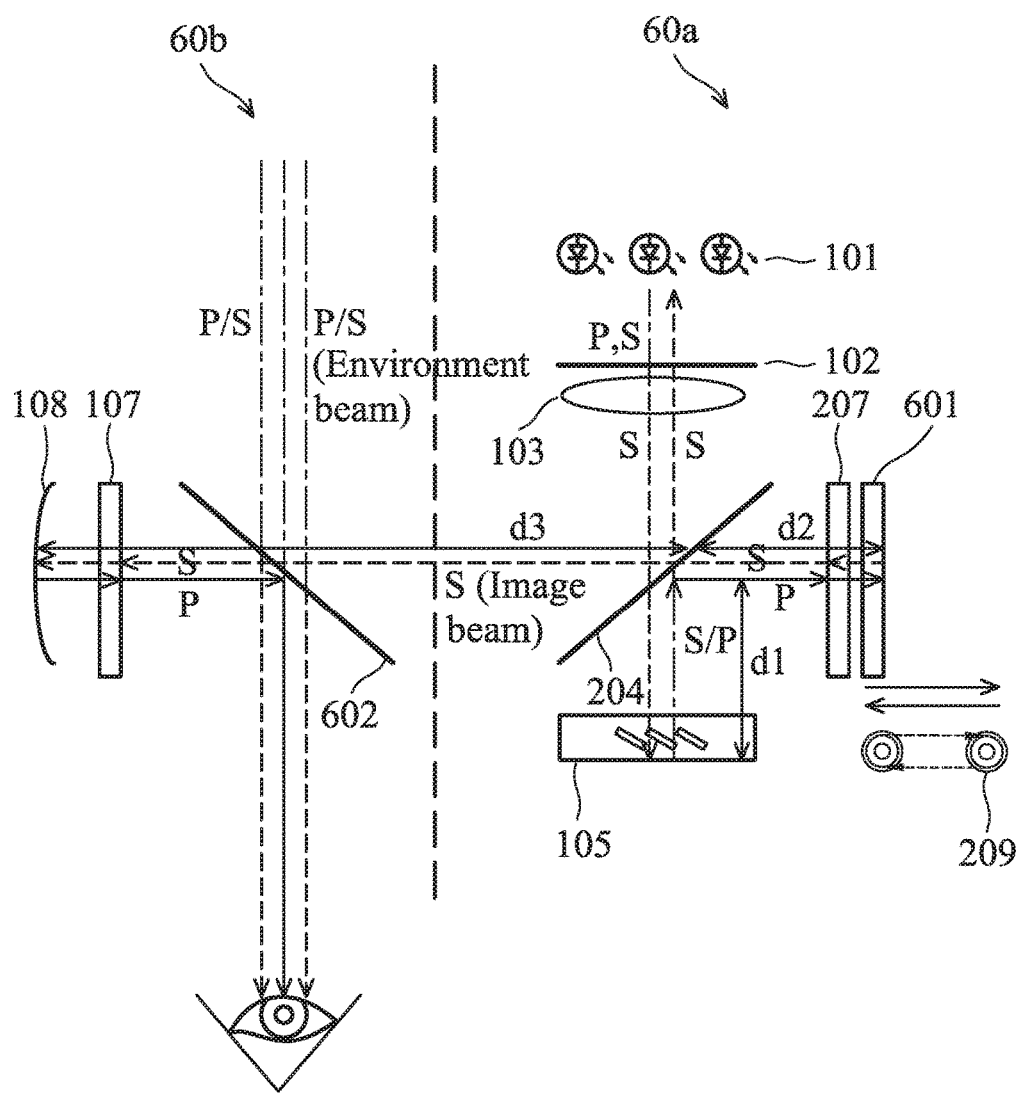
FIG. 7 is a diagram showing a structure of a see-through head-mounted display in accordance with Embodiment 5 of the invention.

FIG. 7 is a diagram showing a structure of a see-through head-mounted display in accordance with Embodiment 5 of the invention. The structure of the see-through head-mounted display 60 of Embodiment 5 comprises: an inner optical mechanism 60a and an outer optical mechanism 60b. Regarding the outer optical mechanism 60b, the arrangement of the outer optical mechanism 60b is the same as the outer optical mechanism 10b shown in FIG. 1, only that the P-type polarizing beam splitter 106 is replaced by the S-type polarizing beam splitter 602. Regarding the inner optical mechanism 60a, the arrangement of the inner optical mechanism 60a is the same as the inner optical mechanism 20a shown in FIG. 2, only that the concave mirror 208 is replaced by the plane mirror 601.

In the inner optical mechanism 60a, the backlight module emits parallel S-polarized beams. Those parallel S-polarized beams emitted by the backlight module are incident to the polarizing beam splitter 204. The polarizing beam splitter 204 transmits the incident S-polarized beam to the LCOS panel 105. The LCOS panel 105 sends image light including the S-polarized beam and the P-polarized beam back to the polarizing beam splitter 204. The P-polarized beam is reflected by the polarizing beam splitter 204 to the quarter wave plate 207. The S-polarized beam passes through polarizing beam splitter 204 and becomes a useless light beam. The quarter wave plate 207 converts the P-polarized beam into a circularly polarized beam (such as a clockwise circularly polarized beam). The plane mirror 601 reflects the circularly polarized beam and is incident to the quarter wave plate 207 again. The quarter wave plate 207 converts the circularly polarized beam into the S-polarized beam. The S-polarized beam passes through the polarizing beam splitter 204 and is emitted from the opening of the inner optical mechanism 60a to the outer optical mechanism 60b.

In the outer optical mechanism 60b, the S-polarized beam that came from the inner optical mechanism 60a passes through the polarizing beam splitter 602 and is incident to the quarter wave plate 107. The quarter wave plate 107 converts the S-polarized beam into a circularly polarized beam (such as a clockwise circularly polarized beam). The circularly polarized beam is reflected by the concave mirror 108 and is incident to the quarter wave plate 107 again. The quarter wave plate 107 converts the circularly polarized beam into the P-polarized beam. The P-polarized beam is reflected by the polarizing beam splitter 602 to the user's eye. On the other hand, the real image light from the object including the P-polarized beam and the S-polarized beam is also incident to the polarizing beam splitter 602, and only the S-polarized beam of the real image light passes through the polarizing beam splitter 602 and is incident to the user's eye.

The see-through head-mounted display 60 of Embodiment 5 also has a driving motor 209 in the inner optical mechanism 60a to move the plane mirror 601 with respect to the quarter wave plate 207. Therefore, the see-through head-mounted display 60 of Embodiment 5 can adjust the virtual image distance as well. However, the optical distance from the LCOS panel 105 to the concave mirror 108 should be shorter than or equal to the focal length of the concave mirror 108. Therefore, if the distance from the LCOS panel 105 to a splitting interface of the polarizing beam splitter 204 is d1, the distance from the splitting interface of the polarizing beam splitter 204 to the plane mirror 601 is d2, the distance from the splitting interface of the polarizing beam splitter 204 to the concave mirror 108 is d3, and the focal length of concave mirror 108 is F, and the following equation has to be satisfied:

$$d1+(2 \times d2)+d3 \leq F.$$

Figure 8A:
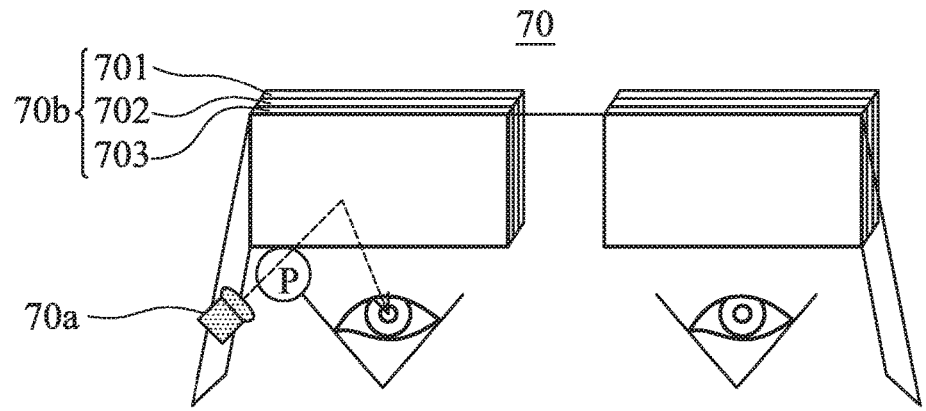
FIG. 8A is a diagram showing a see-through head-mounted display in accordance with Embodiment 6 of the invention.
Figure 8B:
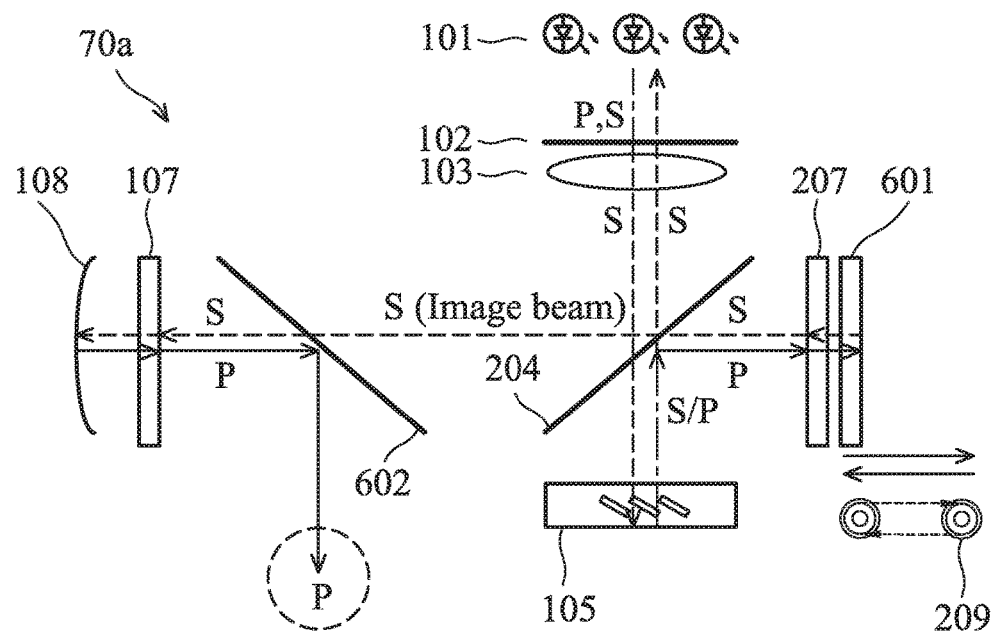
FIG. 8B is a diagram showing the inner optical mechanism of a see-through head-mounted display in accordance with Embodiment 6 of the invention.

FIG. 8A is a diagram showing a see-through head-mounted display in accordance with Embodiment 6 of the invention. FIG. 8B is a diagram showing the inner optical mechanism of a see-through head-mounted display in accordance with Embodiment 6 of the invention. As shown in FIG. 8A, the structure of the see-through head-mounted display 70 of Embodiment 6 comprises: an inner optical mechanism 70a and an outer optical mechanism 70b. Regarding the inner optical mechanism 70a, the structure of the inner optical mechanism 70a shown in FIG. 8B is completely the same as the structure of entire structure (including the inner optical mechanism 60a and the outer optical mechanism 60b) of the see-through head-mounted display 60 as shown in FIG. 7. That is to say, the elements of the see-through head-mounted display 60 of Embodiment 5 are all arranged in the inner optical mechanism. Therefore, as shown in FIG. 8B, the beam emitted from the inner optical mechanism 70a is P-polarized. Regarding the outer optical mechanism 70b, the structure of the outer optical mechanism 60b shown in FIG. 8A is the same as the structure of the outer optical mechanism 40b shown in FIG. 5A, only that the S-type polarizer 401 is replaced by a S-type polarizer 701, the liquid-crystal panel 402 is replaced by a liquid-crystal panel 702, and the P-type polarizing beam splitter 403 is replaced by a S-type polarizing beam splitter 703. Therefore, the P-polarized beam emitted from the inner optical mechanism 70a is reflected by the S-type polarizing beam splitter 703 to the user's eye. In conclusion, the difference between the outer optical mechanism 70b and the outer optical mechanism 40b is that light of different polarizations are incident to the user's eye.

In Embodiment 6, because the plane mirror 601 and the concave mirror are both arranged in the inner optical mechanism 70a, the driving motor 209 is not limited to moving the plane mirror 601 to adjust the virtual image distance as shown in FIG. 8B. The driving motor 209 can be designed to move the concave mirror 108 to adjust the virtual image distance as well.

Figure 2:
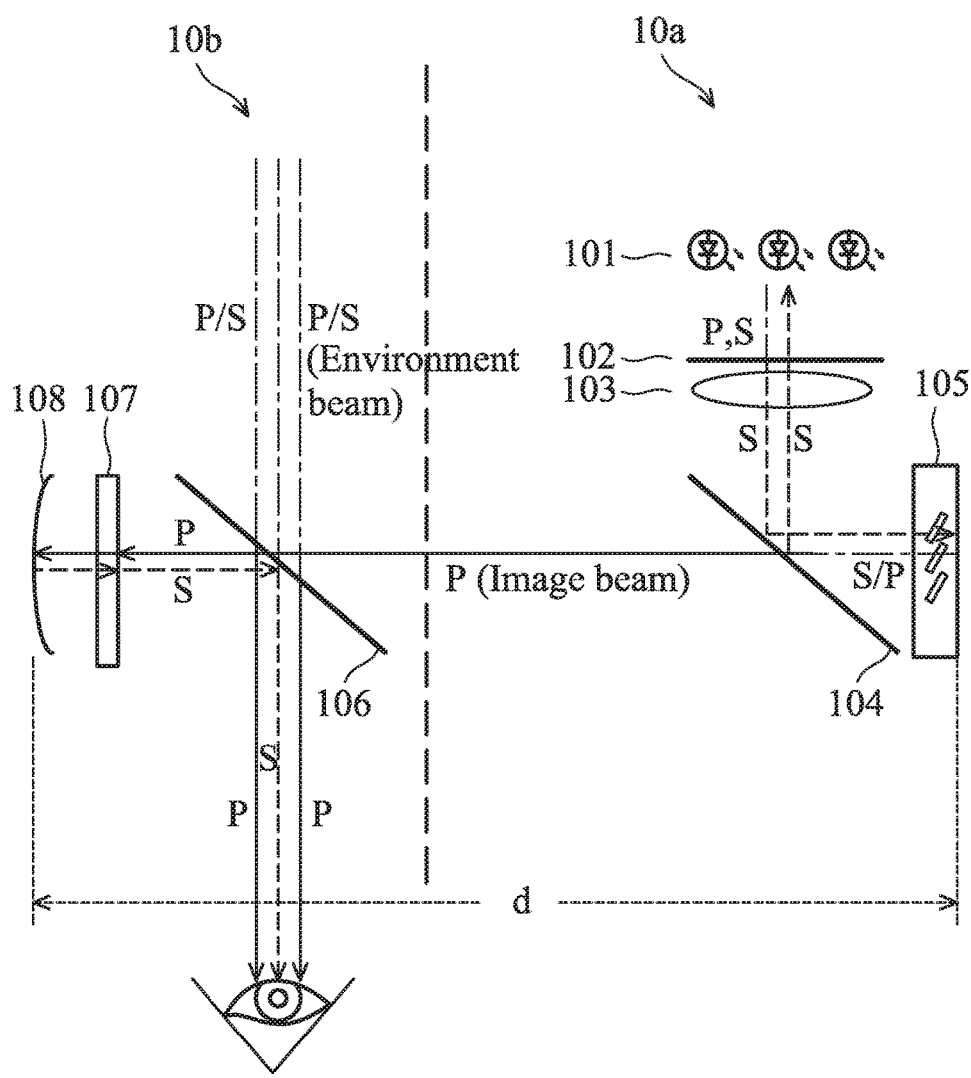
FIG. 2 is a diagram showing a structure of a conventional see-through head-mounted display.
Figure 9A:
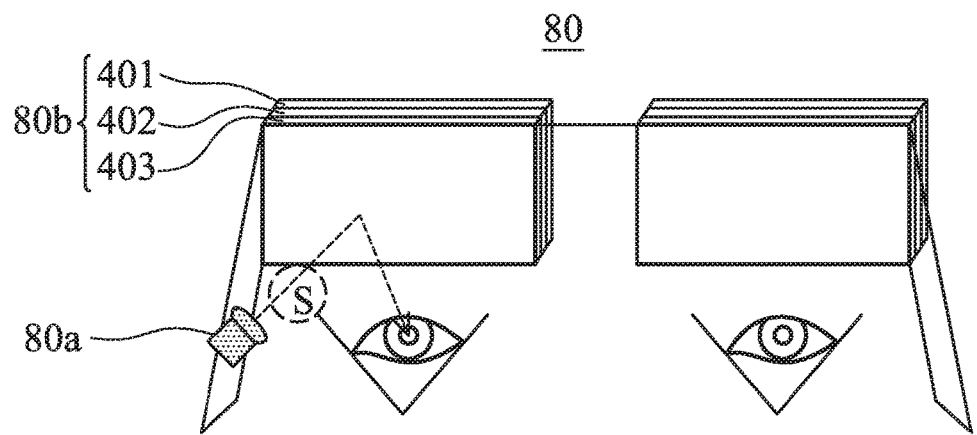
FIG. 9A is a diagram showing a see-through head-mounted display in accordance with Embodiment 7 of the invention.
Figure 9B:
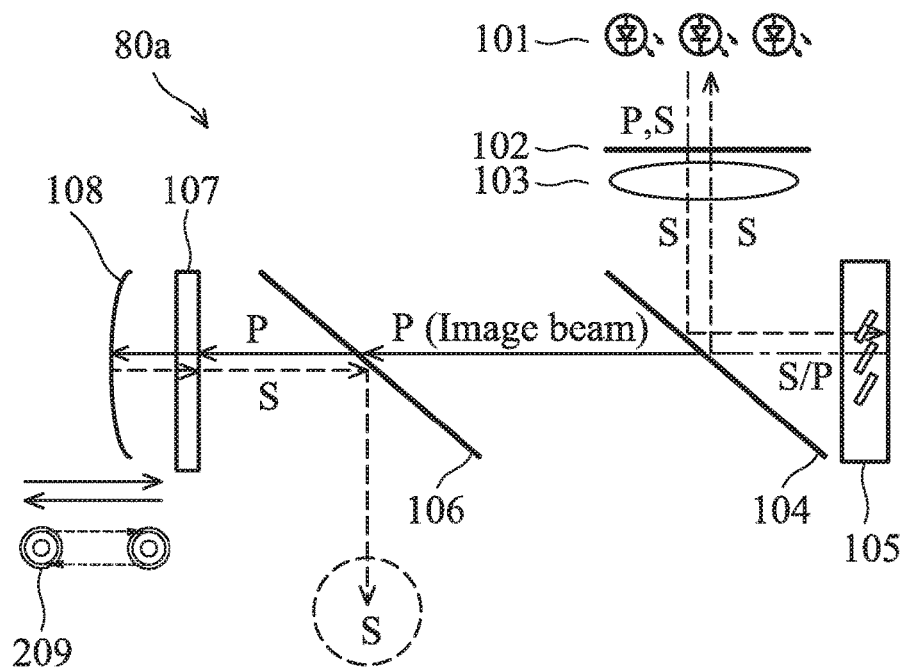
FIG. 9B is a diagram showing the inner optical mechanism of a see-through head-mounted display in accordance with Embodiment 7 of the invention.

FIG. 9A is a diagram showing a see-through head-mounted display in accordance with Embodiment 7 of the invention. FIG. 9B is a diagram showing the inner optical mechanism of a see-through head-mounted display in accordance with Embodiment 7 of the invention. As shown in FIG. 9A, the structure of the see-through head-mounted display 80 of Embodiment 7 comprises: an inner optical mechanism 80a and an outer optical mechanism 80b. Regarding the inner optical mechanism 80a, the structure of the inner optical mechanism 80a shown in FIG. 9B includes the entire structure (including the inner optical mechanism 10a and the outer optical mechanism 10b) of the see-through head-mounted display 10 as shown in FIG. 2. That is to say, the elements of the conventional see-through head-mounted display 10 are all arranged in the inner optical mechanism. Therefore, as shown in FIG. 9B, the beam emitted from the inner optical mechanism 80a is P-polarized. The inner optical mechanism 80a further includes the driving motor designed to move the concave mirror 108 to adjust the virtual image distance. Regarding the outer optical mechanism 80b, the structure of the outer optical mechanism 80b shown in FIG. 8A is the same as the structure of the outer optical mechanism 40b shown in FIG. 5A. In this way, the outer optical mechanism 80b reflects the S-polarized beam emitted from the inner optical mechanism 80a to the user's eye.

Figure 10:
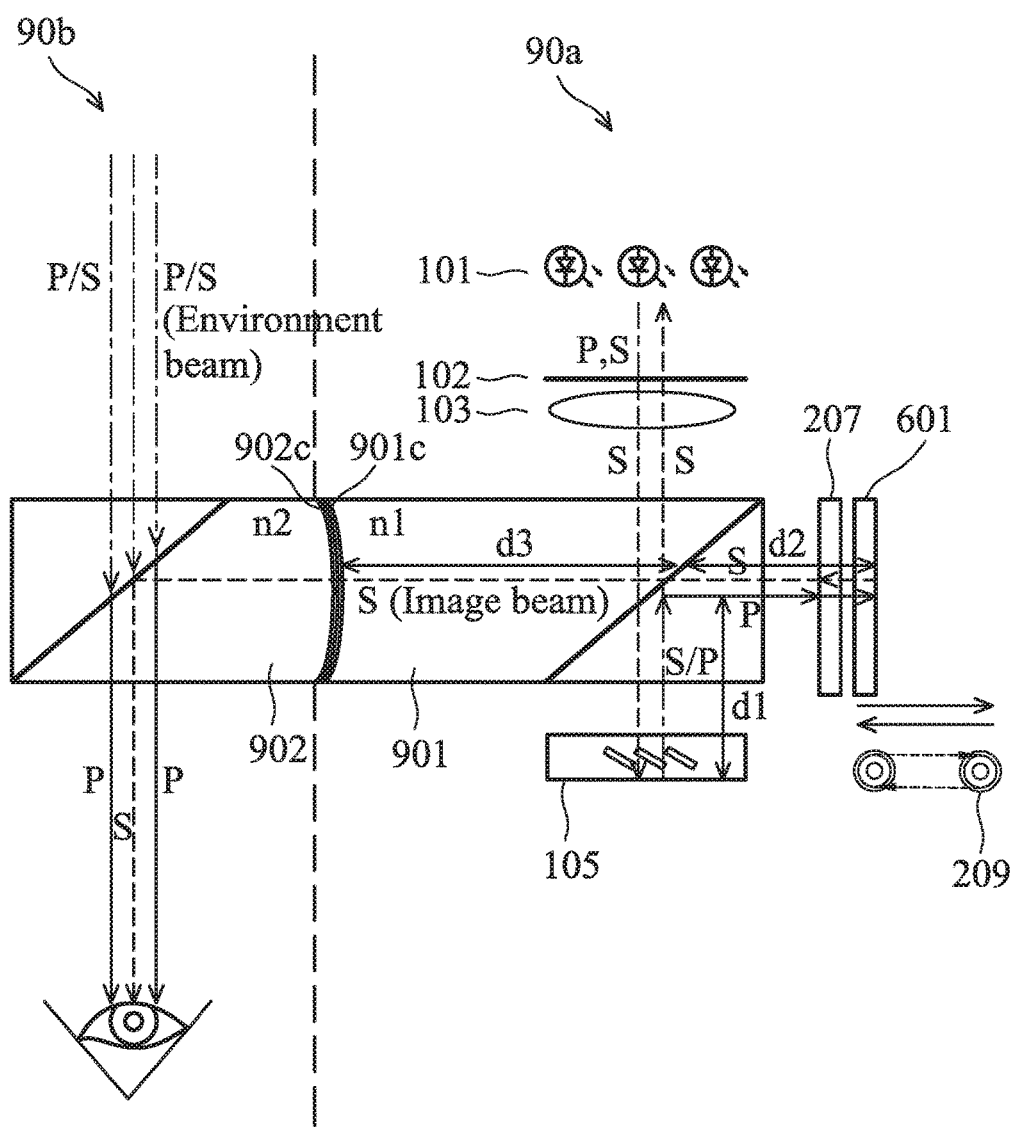
FIG. 10 is a diagram showing a structure of a see-through head-mounted display in accordance with Embodiment 8 of the invention.

FIG. 10 is a diagram showing a structure of a see-through head-mounted display in accordance with Embodiment 8 of the invention. As shown in FIG. 10, the structure of the see-through head-mounted display 90 of Embodiment 8 includes: an inner optical mechanism 90a and an outer optical mechanism 90b. Regarding the inner optical mechanism 90a, the arrangement of the inner optical mechanism 90a is the same as the inner optical mechanism 60a shown in FIG. 7, only that the polarizing beam splitter 204 is replaced by a lens 901 which is also provided with a polarizing beam splitting function. Regarding the outer optical mechanism 90b, the arrangement of the outer optical mechanism 90b is the same as the outer optical mechanism 20b shown in FIG. 3, only that the polarizing beam splitter 206 is replaced by a lens 902 which is also provided with a polarizing beam splitting function. The lens 901 has a concave surface 901c as a light emitting surface thereof. The lens 902 has a convex surface 902c as a light incident surface thereof. The concave surface 901c and the convex surface 902c have the same curvature and are adhered together to form a compound lens.

The virtual image beam is emitted from the lens 901 to the lens 902. In order to make the lens 902 performs the function of a convex lens, the refractive index of the lens 901 is set to be less than the refractive index of the lens 902. Namely, if the refractive index of the lens 901 is n1 and the refractive index of the lens 902 is n2, and the following equation is satisfied:

$$n1<n2.$$

Regarding the optical path of the see-through head-mounted display 90, first, the backlight module emits parallel S-polarized beams. Those parallel S-polarized beams emitted by the backlight module are incident to the lens 901. The lens 901 comprises an S-type polarizing beam splitter which transmits the incident S-polarized beam to the LCOS panel 105. The LCOS panel 105 sends image light including the S-polarized beam and the P-polarized beam back to the lens 901. The P-polarized beam is reflected by the lens 901 to the quarter wave plate 207. The S-polarized beam passes through the lens 901 and becomes a useless light beam. The quarter wave plate 207 converts the P-polarized beam into a circularly polarized beam (such as a clockwise circularly polarized beam). The plane mirror 601 reflects the circularly polarized beam and is incident to the quarter wave plate 207 again. The quarter wave plate 207 converts the circularly polarized beam into the S-polarized beam. The S-polarized beam passes through the lens 901 and is incident to the lens 902. The lens 902 includes a P-type polarizing beam splitter which reflects the S-polarized beam to the user's eye. On the other hand, the real image light from the object including the P-polarized beam and the S-polarized beam is also incident to the lens 902, and only the P-polarized beam of the real image light passes through the lens 902 and is incident to the user's eye. In this way, the see-through head-mounted display 90 also allows the user to see both the real image and the virtual image.

In the structure of Embodiment 8, the lens 902 is equal to a convex lens. According to the principle of imaging for a convex lens, when an object is placed at a distance within the focal length of a convex lens, a magnified virtual image of the object is formed. The closer the object gets to the focal point of the convex lens, the bigger the magnified virtual image becomes, and the longer the virtual image distance from the convex lens becomes. Therefore, the driving motor 209 is arranged in the inner optical mechanism 90a to move the plane mirror 601 to change the optical path from the object to the convex lens. Note that the object has to be placed at a distance within the focal length of a convex lens to form a virtual image. Thus, the optical distance from the LCOS panel 105 to the convex lens 902 should be shorter than or equal to the focal length of the convex lens 902. If the distance between the LCOS panel 105 and a splitting interface of the lens 901 is d1, the distance between the splitting interface of the lens 901 and the plane mirror 601 is d2, the distance between the splitting interface of the lens 901 and the convex surface 902c of the lens 902 is d3, and the first focal length of convex lens 902 is F, and the following equation has to be satisfied:

$$d1+(2\times d2)+d3 \leq F.$$

Figure 11A:
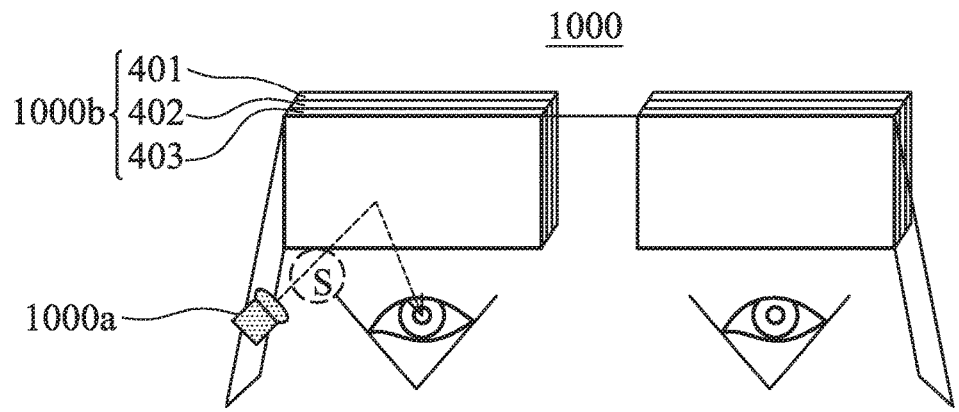
FIG. 11A is a diagram showing a see-through head-mounted display in accordance with Embodiment 9 of the invention.
Figure 11B:
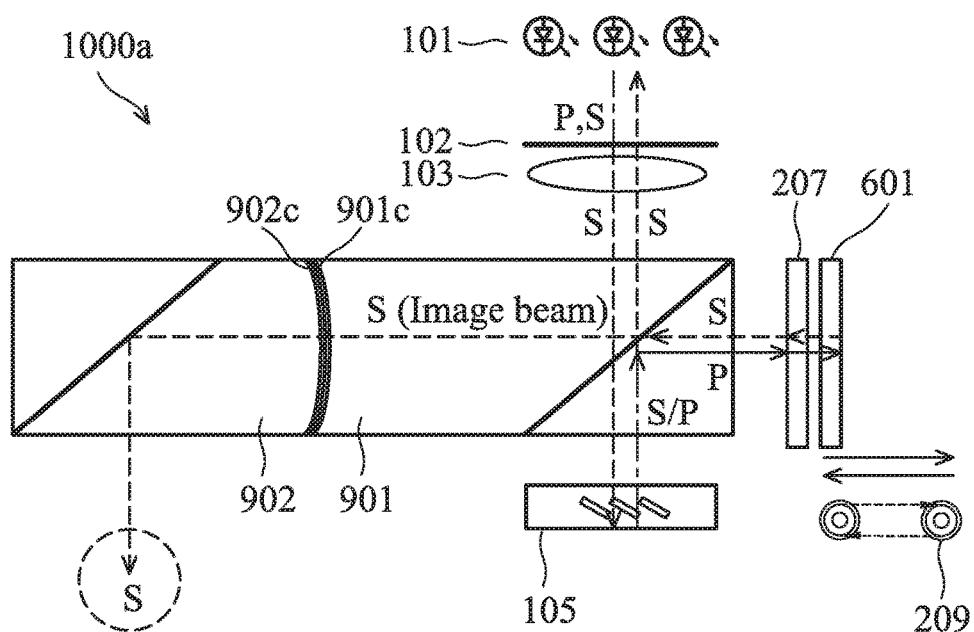
FIG. 11B is a diagram showing the inner optical mechanism of a see-through head-mounted display in accordance with Embodiment 9 of the invention.

FIG. 11A is a diagram showing a see-through head-mounted display in accordance with Embodiment 9 of the invention. FIG. 11B is a diagram showing the inner optical mechanism of a see-through head-mounted display in accordance with Embodiment 9 of the invention. As shown in FIG. 11A, the structure of the see-through head-mounted display 1000 of Embodiment 9 includes: an inner optical mechanism 1000a and an outer optical mechanism 1000b. Regarding the inner optical mechanism 1000a, the structure of the inner optical mechanism 1000a shown in FIG. 11B is completely the same as the structure of entire structure (including the inner optical mechanism 90a and the outer optical mechanism 90b) of the see-through head-mounted display 90 as shown in FIG. 10. That is to say, the elements of the see-through head-mounted display 90 of Embodiment 8 are all arranged in the inner optical mechanism. Therefore, as shown in FIG. 11B, the beam emitted from the inner optical mechanism 1000a is S-polarized. Regarding the outer optical mechanism 1000b, the structure of the outer optical mechanism 1000b shown in FIG. 11A is the same as the structure of the outer optical mechanism 40b shown in FIG. 5A. In this way, the outer optical mechanism 1000b reflects the S-polarized beam emitted from the inner optical mechanism 1000a to the user's eye.

Figure 12A:
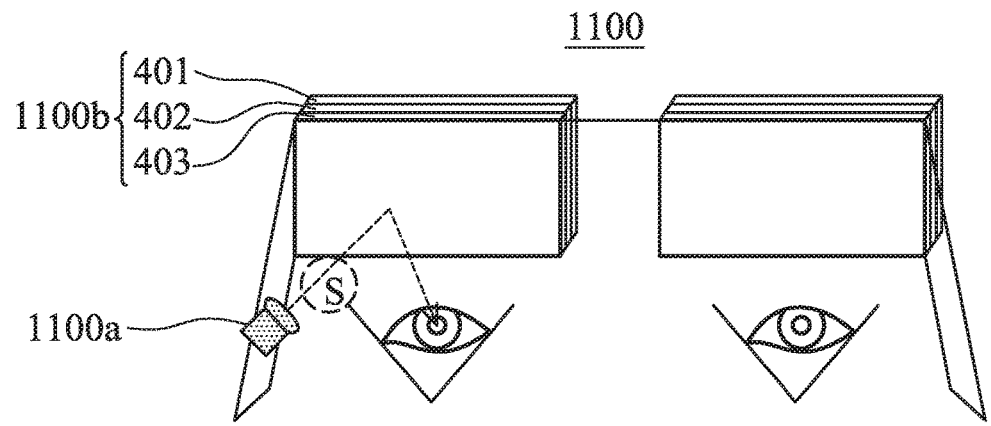
FIG. 12A is a diagram showing a see-through head-mounted display in accordance with Embodiment 10 of the invention.
Figure 12B:
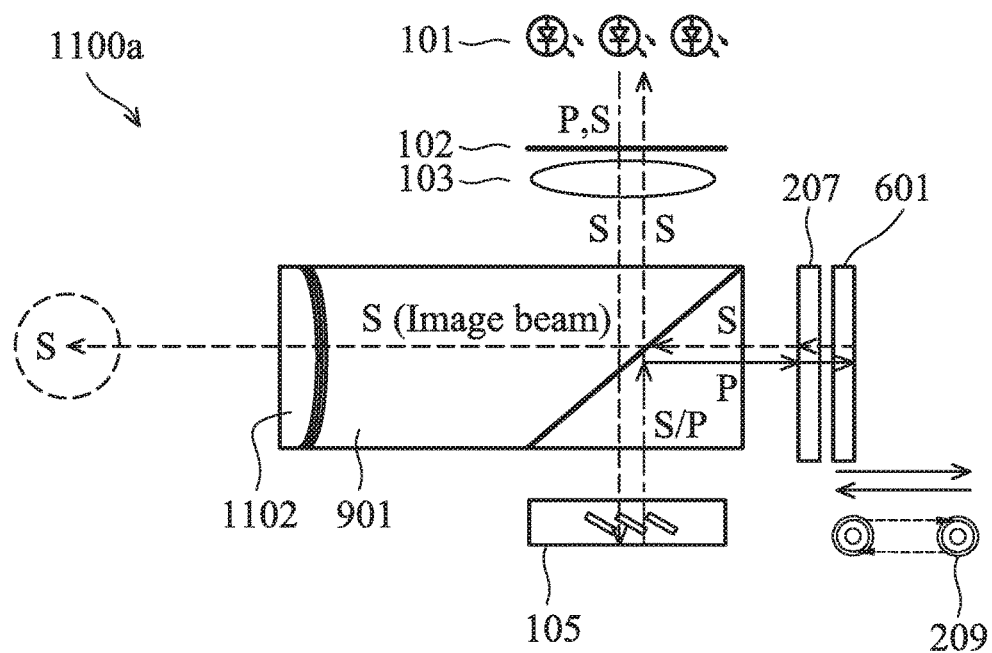
FIG. 12B is a diagram showing the inner optical mechanism of a see-through head-mounted display in accordance with Embodiment 10 of the invention.

FIG. 12A is a diagram showing a see-through head-mounted display in accordance with Embodiment 10 of the invention. FIG. 12B is a diagram showing the inner optical mechanism of a see-through head-mounted display in accordance with Embodiment 10 of the invention. As shown in FIG. 12A, the structure of the see-through head-mounted display 1100 of Embodiment 10 includes: an inner optical mechanism 1100a and an outer optical mechanism 1100b. Regarding the inner optical mechanism 1100a, the difference between the structure of the inner optical mechanism 1100a shown in FIG. 12B and the structure of the inner optical mechanism 1000a shown in FIG. 11B is that the lens 902 is replaced by a lens 1102 which is not provided with the polarizing beam splitting function. Therefore, as shown in FIG. 12B, the S-polarized beam traveling through the lens 901 doesn't change its traveling direction and is directly incident to the outer optical mechanism 1100b. Regarding the outer optical mechanism 1100b, the structure of the outer optical mechanism 1100b shown in FIG. 12A is the same as the structure of the outer optical mechanism 40b shown in FIG. 5A. In this way, the outer optical mechanism 1100b reflects the S-polarized beam emitted from the inner optical mechanism 1100a to the user's eye.

According to the above embodiments, a driving motor is arranged to move the concave mirror or plane mirror to change the virtual image distance. Because the movable elements are arranged in the inner optical mechanism, the reliability, stability, and durability issues for the see-through head-mounted display are substantially solved.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A see-through head-mounted display, comprising:
an inner optical mechanism covered by a nontransparent housing having an opening and providing an image beam from the opening; and
an outer optical mechanism comprising an outer polarizing beam splitter guiding the image beam from the opening and an environment beam to the same direction,
wherein the inner optical mechanism comprises:
an inner polarizing beam splitter, reflecting either a first polarized beam which is polarized in a first direction or a second polarized beam which is polarized in a second direction perpendicular to the first direction, and transmitting the other;
a backlight module providing the first polarized beam to the inner polarizing beam splitter;
a micro display panel converting the first polarized beam from the inner polarizing beam splitter to the second polarized beam which is utilized as the image beam and directing the image beam back to the inner polarizing beam splitter;
an inner ¼ wave plate through which the image beam from the inner polarizing beam splitter travels;
a mirror reflecting the image beam traveling through the inner ¼ wave plate to make the image beam incident to the inner ¼ wave plate and the inner polarizing beam splitter in sequence and emitted from the opening; and
a driving motor moving the mirror to vary the distance between the mirror and the inner ¼ wave plate,
wherein the mirror is a concave mirror,
wherein the backlight module and the opening are arranged at a first side of a splitting interface of the inner polarizing beam splitter, and the micro display panel, the inner ¼ wave plate, and the concave mirror are arranged at a second side of the splitting interface of the inner polarizing beam splitter, which is opposite to the first side, and
wherein the inner polarizing beam splitter transmits the first polarized beam and reflects the second polarized beam, and the outer polarizing beam splitter transmits the second polarized beam and reflects the first polarized beam.

2. The see-through head-mounted display as claimed in claim 1, wherein the distance between the micro display panel and the splitting interface of the inner polarizing beam splitter is d1; the distance between the concave mirror and the splitting interface of the inner polarizing beam splitter is d2; the focal length of concave mirror is F; and the following equation is satisfied:

$$d1+d2 \leq F.$$

3. A see-through head-mounted display, comprising:
an inner optical mechanism covered by a nontransparent housing having an opening and providing an image beam from the opening; and
an outer optical mechanism comprising an outer polarizing beam splitter guiding the image beam from the opening and an environment beam to the same direction,
wherein the inner optical mechanism comprises:
an inner polarizing beam splitter, reflecting either a first polarized beam which is polarized in a first direction or a second polarized beam which is polarized in a second direction perpendicular to the first direction, and transmitting the other;
a backlight module providing the first polarized beam to the inner polarizing beam splitter;
a micro display panel converting the first polarized beam from the inner polarizing beam splitter to the second polarized beam which is utilized as the image beam and directing the image beam back to the inner polarizing beam splitter;

an inner ¼ wave plate through which the image beam from the inner polarizing beam splitter travels;

a mirror reflecting the image beam traveling through the inner ¼ wave plate to make the image beam incident to the inner ¼ wave plate and the inner polarizing beam splitter in sequence and emitted from the opening; and a driving motor moving the mirror to vary the distance between the mirror and the inner ¼ wave plate, wherein the mirror is a concave mirror, the outer optical mechanism further comprises:

a polarizer, passing the first polarized beam of the environment beam, and a liquid-crystal panel, arranged between the polarizer and the outer polarizing beam splitter and controlled by voltage to modulate the first polarized beam incident from the polarizer and provide the modulated beam to the outer polarizing beam splitter, wherein the backlight module and the opening are arranged at a first side of a splitting interface of the inner polarizing beam splitter, and the micro display panel, the inner ¼ wave plate, and the concave mirror are arranged at a second side of the splitting interface of the inner polarizing beam splitter, which is opposite to the first side, and wherein the inner polarizing beam splitter transmits the first polarized beam and reflects the second polarized beam, and the outer polarizing beam splitter transmits the second polarized beam and reflects the first polarized beam.

4. A see-through head-mounted display, comprising:

an inner optical mechanism covered by a nontransparent housing having an opening and providing an image beam from the opening; and an outer optical mechanism comprising an outer polarizing beam splitter guiding the image beam from the opening and an environment beam to the same direction, wherein the inner optical mechanism comprises:

an inner polarizing beam splitter, reflecting either a first polarized beam which is polarized in a first direction or a second polarized beam which is polarized in a second direction perpendicular to the first direction, and transmitting the other;

a backlight module providing the first polarized beam to the inner polarizing beam splitter;

a micro display panel converting the first polarized beam from the inner polarizing beam splitter to the second polarized beam which is utilized as the image beam and directing the image beam back to the inner polarizing beam splitter;

an inner ¼ wave plate through which the image beam from the inner polarizing beam splitter travels;

a mirror reflecting the image beam traveling through the inner ¼ wave plate to make the image beam incident to the inner ¼ wave plate and the inner polarizing beam splitter in sequence and emitted from the opening; and a driving motor moving the mirror to vary the distance between the mirror and the inner ¼ wave plate, wherein the mirror is a concave mirror, the outer optical mechanism further comprises:

a polarizer, passing the first polarized beam of the environment beam, and a liquid-crystal panel, arranged between the polarizer and the outer polarizing beam splitter and controlled by voltage to modulate the first polarized beam incident from the polarizer and provide the modulated beam to the outer polarizing beam splitter, wherein the backlight module and the micro display panel are arranged at a first side of a splitting interface of the inner polarizing beam splitter, and the inner ¼ wave plate, the concave mirror, and the opening are arranged at a second side of the splitting interface of the inner polarizing beam splitter, which is opposite to the first side, and wherein both the inner and outer polarizing beam splitters transmit the second polarized beam and reflect the first polarized beam.

5. The see-through head-mounted display as claimed in claim 1, wherein the mirror is a plane mirror, and the outer optical mechanism further comprises:

an outer ¼ wave plate through which the image beam from the opening travels, and a concave mirror reflecting the image traveling through the outer ¼ wave plate to make the image beam incident to the outer ¼ wave plate and the outer polarizing beam splitter in sequence and emitted in the direction where the environment beam travels.

6. The see-through head-mounted display as claimed in claim 5, wherein it is assumed that the distance between the micro display panel and a splitting interface of the inner polarizing beam splitter is d1; the distance between the plane mirror and the splitting interface of the inner polarizing beam splitter is d2; the distance between the splitting interface of the inner polarizing beam splitter and the concave mirror is d3; and the focal length of concave mirror is F, and the following equation is satisfied:

$d1+2\times d2+d3 \leq F.$

7. The see-through head-mounted display as claimed in claim 5, wherein both the inner and outer polarizing beam splitters transmit the first polarized beam and reflect the second polarized beam.

8. The see-through head-mounted display as claimed in claim 1, wherein the mirror is a plane mirror, the inner polarizing beam splitter is formed from a first lens with a polarizing beam splitting function, and the outer polarizing beam splitter is formed from a second lens with a polarizing beam splitting function, wherein the first lens has a concave surface as a light emitting surface and the second lens has a convex surface as a light incident surface, wherein the concave surface and the convex surface are adhered together such that the first lens and the second lens forms a compound lens.

9. The see-through head-mounted display as claimed in claim 8, wherein it is assumed that the refractive index of the first lens is n1 and the refractive index of the second lens is n2, and the following equation is satisfied:

$n1 < n2,$ and wherein it is assumed that the distance between the micro display panel and a splitting interface of the inner polarizing beam splitter is d1; the distance between the plane mirror and the splitting interface of the inner polarizing beam splitter is d2; the distance between the splitting interface of the inner polarizing beam splitter and the adhered interface of the compound lens is d3; and the focal length of convex surface of the second lens is F, and the following equation is satisfied:

$d1+2\times d2+d3 \leq F.$

10. The see-through head-mounted display as claimed in claim 8, wherein the inner polarizing beam splitter transmits the first polarized beam and reflects the second polarized beam, and the outer polarizing beam splitter transmits the second polarized beam and reflects the first polarized beam.

\* \* \* \* \*